(12) United States Patent
Unno (10) Patent No.: US 11,416,194 B2
(45) Date of Patent: Aug. 16, 2022

(54) IMAGE FORMING APPARATUS AND CONTROL METHOD

(71) Applicant: CANON KABUSHIKI KAISHA, Tokyo (JP)

(72) Inventor: Koichi Unno, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/145,845

(22) Filed: Jan. 11, 2021

(65) Prior Publication Data
US 2021/0240419 A1 Aug. 5, 2021

(30) Foreign Application Priority Data
Jan. 30, 2020 (JP) .............. JP2020-014213

(51) Int. Cl.
G06F 3/12 (2006.01)

(52) U.S. Cl.
CPC .......... *G06F 3/1239* (2013.01); *G06F 3/1219* (2013.01); *G06F 3/1258* (2013.01)

(58) Field of Classification Search
None
See application file for complete search history.

(56) References Cited

U.S. PATENT DOCUMENTS 5,699,172 A * 12/1997 Hattori .............. G06K 15/128
358/1.1

FOREIGN PATENT DOCUMENTS

| JP | H08149242 A | | 6/1996 |
| JP | 2001136386 | * | 5/2001 |
| JP | 2004248040 A | * | 9/2004 |

* cited by examiner

*Primary Examiner* — Fan Zhang
(74) *Attorney, Agent, or Firm* — Canon U.S.A., Inc. I.P. Division

(57) ABSTRACT

An image forming apparatus includes a scanner, a receiver, and a controller. The scanner scans a document to obtain image data representing the scanned document. The receiver receives faxed image data. The controller includes a processor and a memory, performs processing for reducing usage of a consumable material on the image data obtained by the scanner, and does not perform the processing on image data obtained from an external apparatus.

16 Claims, 12 Drawing Sheets

| | | |
|---|---|---|
| COPIES | 1 | |
| COLOR SETTING | B&W | |
| COPY RATIO SETTING | 100 | |
| PAPER SETTING | CASSETTE 1 | |
| LAYOUT SETTING | STANDARD | |
| ⋮ | | |
| DENSITY | 5 | |
| BACKGROUND ADJUSTMENT | OFF | |
| REDUCE SHOW-THROUGH | OFF | |
| ⋮ | | |

IMAGE FORMING APPARATUS AND CONTROL METHOD

BACKGROUND

Field of the Invention

The present disclosure relates to an image forming apparatus and a control method for controlling the image forming apparatus.

Description of the Related Art

There is known a multi-function peripheral (MFP) that combines a plurality of functions such as copying, faxing, and printing into one unit. In such an MFP, the consumption amount of a consumable material such as toner or ink used for printing is reduced by setting the reference density level for printing to be low, as discussed in Japanese Patent Application Laid-Open No. 8-149242.

However, for example, if image data received via facsimile (FAX) is printed at a lower density, the resulting image may be illegible depending on the FAX transmission resolution. If the image is illegible, it is necessary to ask the sender to transmit the image data again.

SUMMARY

According to an aspect of the present disclosure, an image forming apparatus includes a scanner configured to scan a document to obtain image data representing the scanned document, a receiver configured to receive faxed image data, and a controller including a processor and a memory, the controller being configured to perform processing for reducing usage of a consumable material on the image data obtained by the scanner, and not to perform the processing on image data obtained from an external apparatus.

Further features of the present disclosure will become apparent from the following description of exemplary embodiments with reference to the attached drawings.

DESCRIPTION OF THE EMBODIMENTS

Exemplary embodiments of the present disclosure will be described below with reference to the accompanying drawings.

Figure 1:
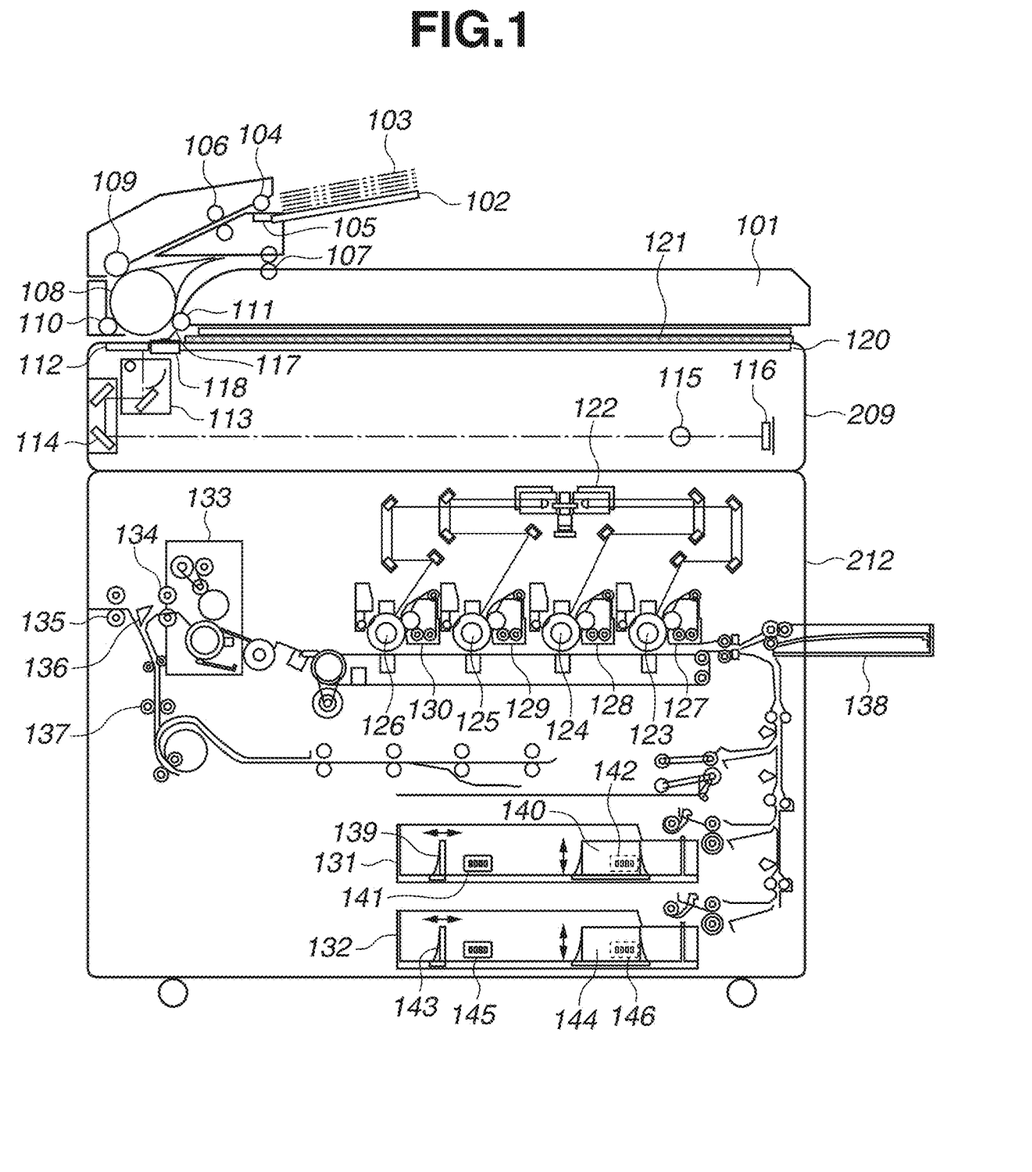
FIG. 1 is a diagram illustrating a configuration of a scanner and a printer in an image forming apparatus according to a first exemplary embodiment of the present disclosure.
Figure 2:
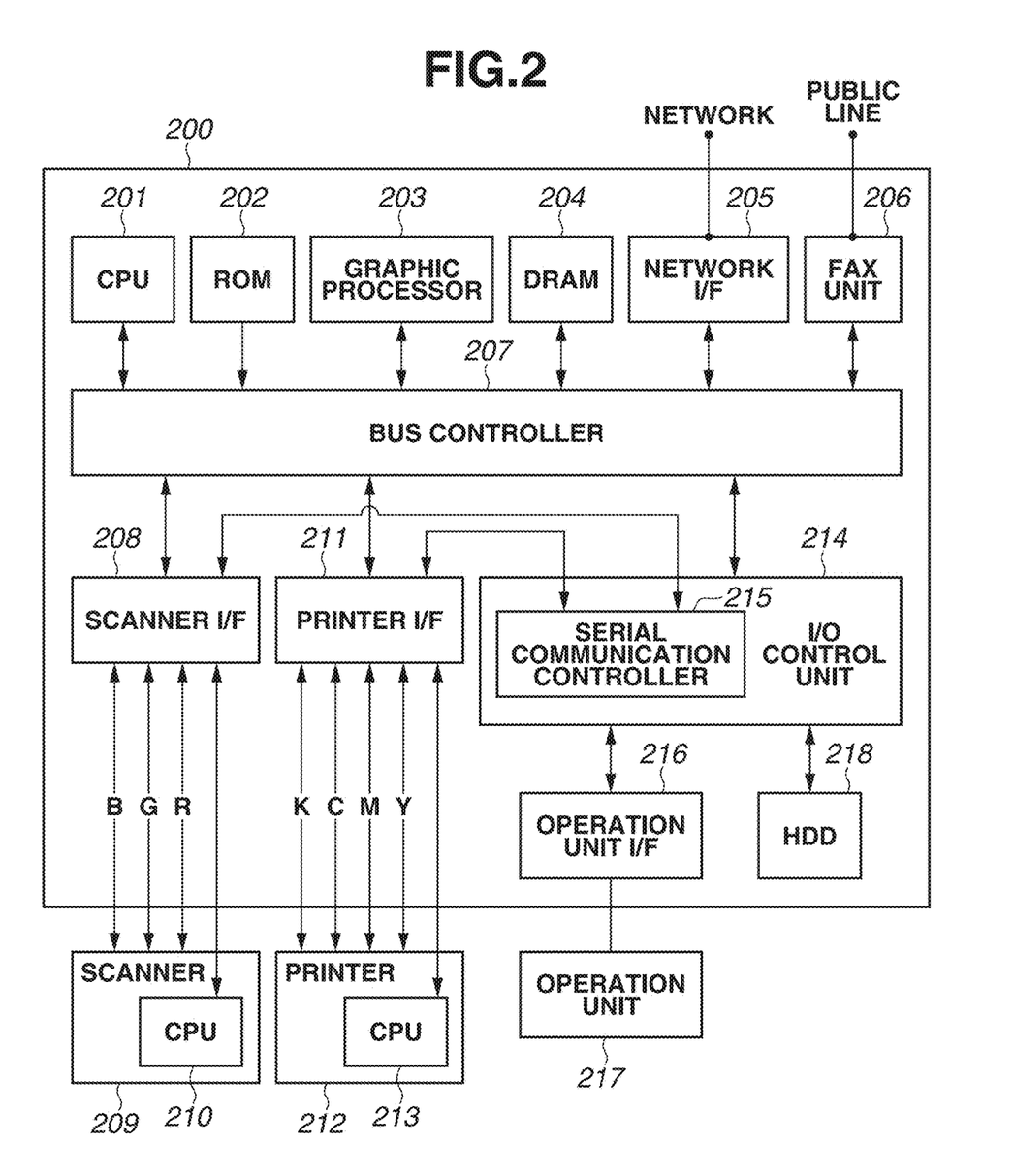
FIG. 2 is a block diagram of the image forming apparatus according to the first exemplary embodiment.

FIG. 1 is a diagram illustrating a configuration of a scanner and a printer in an image forming apparatus according to a first exemplary embodiment. FIG. 2 illustrates processing blocks related to image data processing in a system according to the present exemplary embodiment, or related to operation information and sensor information associated with image processing.

A central processing unit (CPU) 201 plays a central role in control according to the present exemplary embodiment. The CPU 201 controls each unit illustrated in FIGS. 1 and 2 based on a copy function program, a page description language (PDL) function program, or a facsimile (FAX) function program. Each of the function programs is loaded from a hard disk drive (HDD) 218 into a dynamic random access memory (DRAM) 204 via an input/output (I/O) control unit 214 and a bus controller 207 based on a control program stored in a read-only memory (ROM) 202 or an initial program stored in the ROM 202.

Operation of a copy function will be described next with reference to FIGS. 1 and 2.

In FIG. 1, information on a document 103 is scanned while the document 103 is moved relative to an exposure unit 113 of a scanner (document scanner) 209. The document 103 is placed on a document tray 102. A document feed roller 104 is paired with a separation pad 105, and conveys sheets of the document 103 one by one. The conveyed document 103 is fed to the inside of the image forming apparatus by an intermediate roller pair 106, conveyed by a large roller 108 and a first driven roller 109, and further conveyed by the large roller 108 and a second driven roller 110.

The document 103 conveyed by the large roller 108 and the second driven roller 110 passes between a document scanning glass 112 and a document guide plate 117, and is conveyed by the large roller 108 and a third driven roller 111 via a jump stand 118. The document 103 conveyed by the large roller 108 and the third driven roller 111 is discharged to the outside of the apparatus by a document discharge roller pair 107. The document 103 is conveyed between the document scanning glass 112 and the document guide plate 117 while being brought in contact with the document scanning glass 112 by the document guide plate 117.

When the document 103 passes on the document scanning glass 112, the surface of the document 103 being in contact with the document scanning glass 112 is exposed by the exposure unit 113. Reflected light from the document 103 is obtained as a result of the exposure and then transmitted to a mirror unit 114. The transmitted reflected light passes through a lens 115, is collected, and is converted into an electric signal by a charge-coupled device (CCD) unit 116.

In this way, the document 103 is scanned and the electric signal representing image data of the document 103 can be obtained.

The image data of the document 103 converted into the electric signal is converted into a red, green, blue (RGB) signal by control of a CPU 210. Furthermore, the image data is temporarily stored in the DRAM 204 via a scanner interface (I/F) 208 and the bus controller 207 by control of the CPU 201, and then stored in the HDD 218 via the bus controller 207 and the I/O control unit 214.

In a case where the image data stored in the HDD 218 is printed, the image data stored in the HDD 218 is temporarily stored in the DRAM 204 by control of the CPU 201. Subsequently, by a graphic processor 203, the temporarily stored image data is subjected to, for example, color space conversion such as conversion from RGB to cyan, magenta, yellow, and black (CMYK) and scaling processing, and further subjected to layout processing for combining a plurality of pieces of image data stored in the DRAM 204. The image data is then transferred to a printer 212 via a printer I/F 211.

The image data transferred to the printer 212 is converted into laser light by a laser unit 122 illustrated in FIG. 1. The laser unit 122 emits the laser light to form electrostatic latent images on photosensitive drums 123 to 126. Developing units 127 to 130 attract toner to the electrostatic latent images formed on the photosensitive drums 123 to 126, respectively, to form toner images. The toner images are transferred onto a sheet fed from a cassette 131 or a cassette 132. The toner images are further fixed on the sheet by a fixing unit 133. The sheet is then discharged to the outside of the apparatus by conveyance rollers 134 and 135. While an example of using toner as a consumable material is described in the present specification, the consumable material for adding color to a sheet is not limited to toner, and may be another consumable material such as ink.

Next, a PDL print function will be described.

PDL data transmitted from a terminal on a network is received by a network I/F 205. The received PDL data is stored in the HDD 218 by the CPU 201 via the DRAM 204 and the I/O control unit 214. While the CPU 201 transfers the PDL data in the HDD 218 to the DRAM 204 via the I/O control unit 214 based on the PDL function program loaded into the DRAM 204, the CPU 201 sequentially converts the PDL data into image data on the DRAM 204 and stores the image data in the DRAM 204. The CPU 201 causes the graphic processor 203 to perform the color space conversion, the scaling processing, and the like on the image data stored in the DRAM 204 as described above, and then transfers the image data to the printer 212 via the printer I/F 211 to perform printing.

In the case of a FAX reception print function, the CPU 201 stores compressed image data, which has been received by a FAX unit 206 via a public line based on the FAX function program stored in the DRAM 204, in the HDD 218 via the DRAM 204 and the I/O control unit 214. If the CPU 201 determines based on the state of the FAX unit 206 that the reception of the compressed image data from the public line has been completed, the CPU 201 transfers the compressed image data, which has been received from the public line and stored in the HDD 218, to the DRAM 204. Subsequently, the CPU 201 causes the graphic processor 203 to perform decompression processing, the color space conversion, the scaling processing, and the like on the compressed image data, and then transfers the processed data to the printer 212 via the printer I/F 211 to perform printing. The term "FAX" used herein includes Internet FAX (iFAX).

More specifically, the FAX unit 206 includes both a conventional FAX unit that receives image data via a telephone line and an iFAX unit that receives image data via the Internet.

Figure 4:
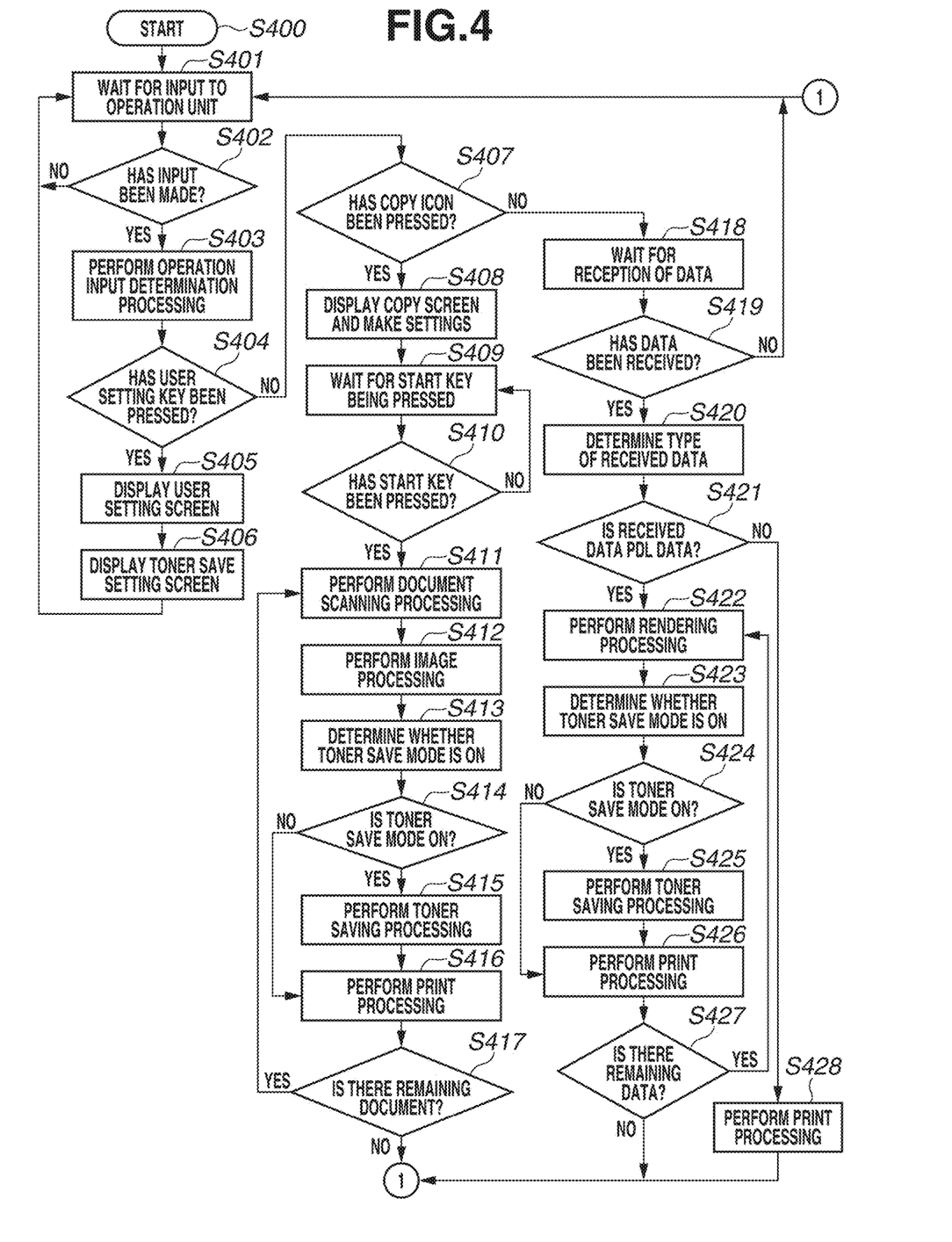
FIG. 4 is a control flowchart according to the first exemplary embodiment.

A representative exemplary embodiment of the present disclosure will be described next with reference to a flowchart illustrated in FIG. 4.

Figure 3:
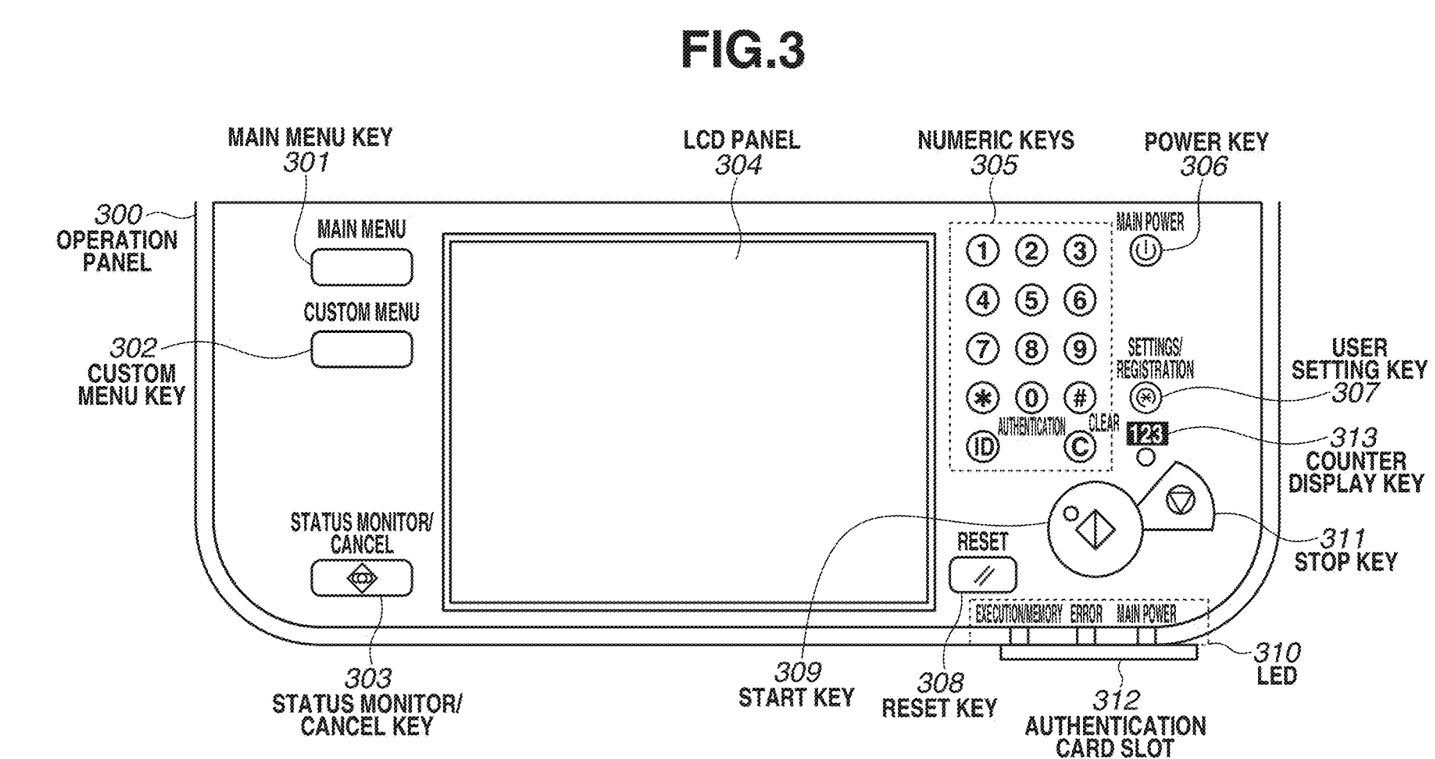
FIG. 3 is an external view of an operation unit according to the first exemplary embodiment.

FIG. 3 illustrates an operation panel 300, i.e., an external appearance of an operation unit 217 (illustrated in FIG. 2). When a user presses a main menu key 301, a custom menu key 302, a status monitor/cancel key 303, numeric keys 305, a user setting key 307, or the like, code data corresponding to the pressed key is transmitted to the CPU 201 via an operation unit I/F 216 (refer to FIG. 2) and the I/O control unit 214.

The image data, which has been loaded into the DRAM 204 and transferred to the operation unit 217 via the I/O control unit 214 and the operation unit I/F 216 by the CPU 201, is displayed on a liquid crystal display (LCD) panel 304. The LCD panel 304 is a touch panel. When the user presses the LCD panel 304, a position of the LCD panel 304 pressed by the user is transmitted as coordinate data to the CPU 201 via the operation unit I/F 216 and the I/O control unit 214. The CPU 201 can determine, based on the coordinate data, which part of the image data is pressed.

Figure 12:
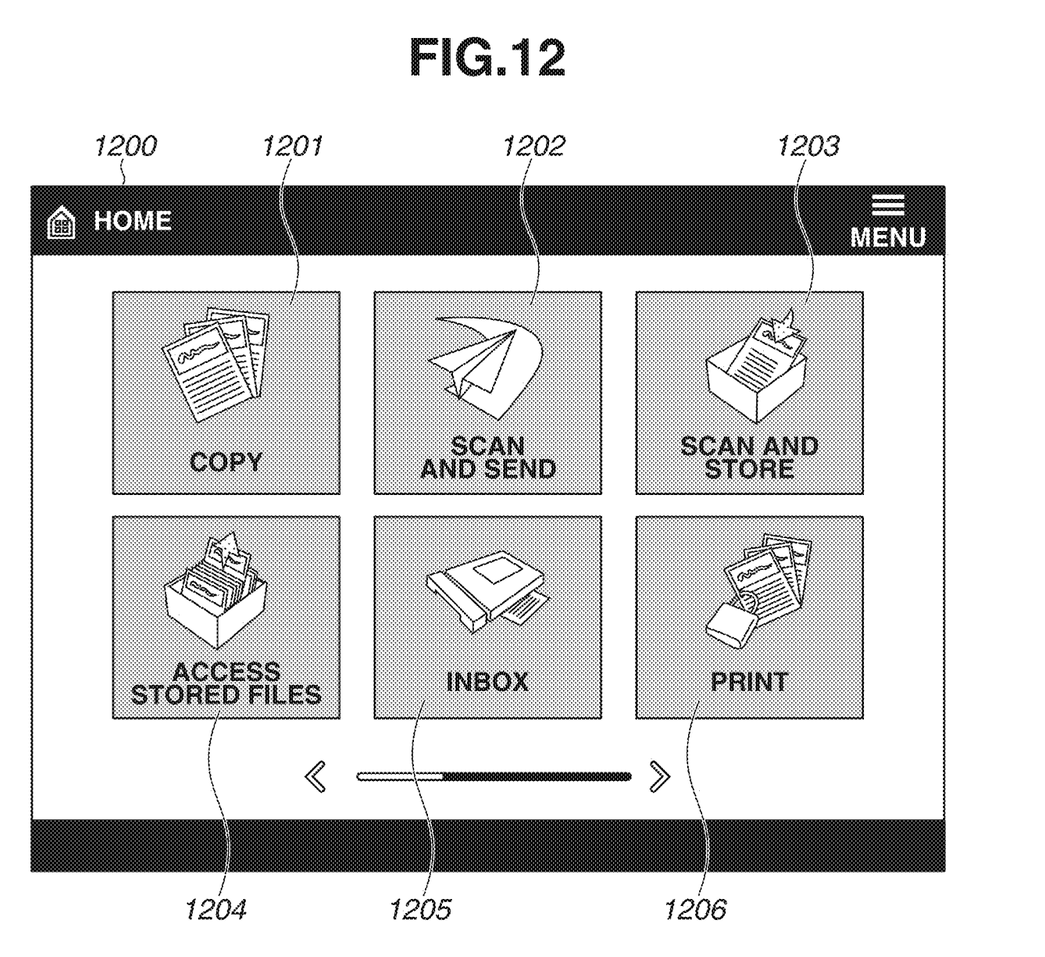
FIG. 12 is a diagram illustrating a home screen displayed on the operation unit according to the first exemplary embodiment.

The CPU 201 creates screen data of a home screen 1200 illustrated in FIG. 12 in the DRAM 204 at the time of power ON, transfers the screen data to the operation unit 217 via the I/O control unit 214 and the operation unit I/F 216, and causes the LCD panel 304 to display the home screen 1200.

In steps S401, the CPU 201 monitors whether the user performs an operation on the operation panel 300. If the CPU 201 receives code data and coordinate data from the operation unit 217 via the operation unit I/F 216 and the I/O control unit 214 (YES in step S402), the processing proceeds to step S403. In step S403, the CPU 201 performs processing for determining which part of the operation panel 300 has been operated.

If the CPU 201 detects that the user has pressed the user setting key 307 (YES in step S404), the processing proceeds to step S405. In step S405, the CPU 201 transfers screen data of a user setting screen on which settings for operating the apparatus are made, to the operation unit 217 via the path described above, and causes the LCD panel 304 to display the user setting screen. In step S406, when the user selects a toner save setting on the user setting screen, the CPU 201 transfers screen data of a toner save setting screen 500 illustrated in FIG. 5 to the operation unit 217, and causes the LCD panel 304 to display the toner save setting screen 500.

Figure 5:
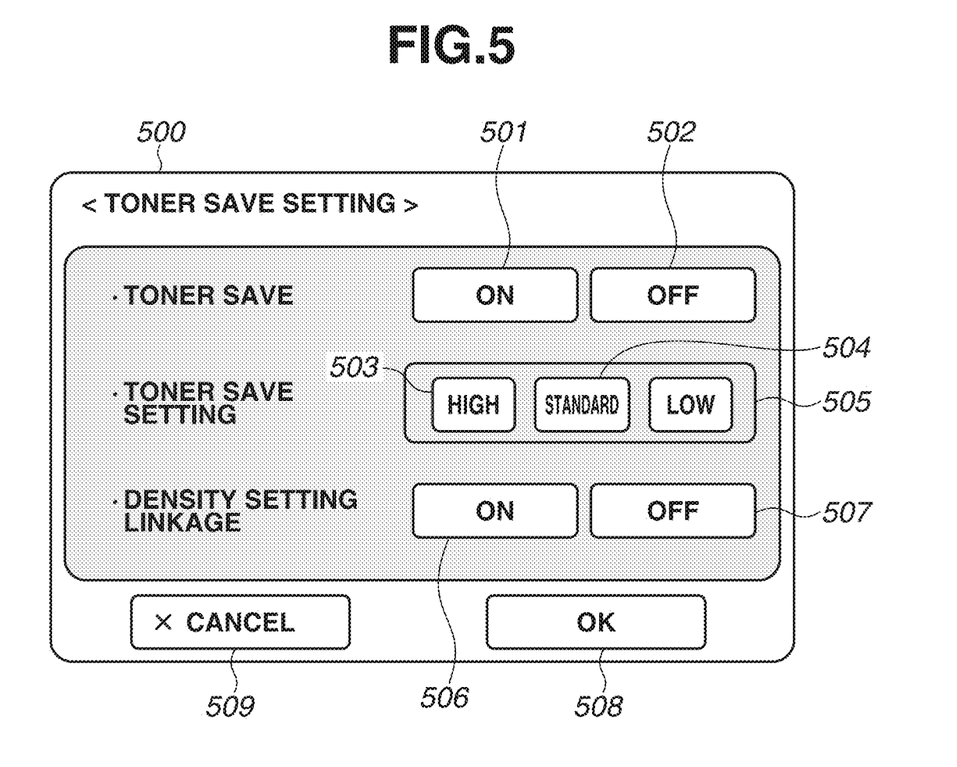
FIG. 5 is a diagram illustrating a mode setting screen according to the first exemplary embodiment.

On the toner save setting screen 500 displayed on the LCD panel 304, the user can select between toner save ON 501 and toner save OFF 502, and also select a toner save setting from high 503, standard 504, and low 505. Coordinate data of the selected items is transmitted to the CPU 201 via the path described above, and the CPU 201 determines which settings are made based on the received coordinate data and the transferred screen data of the toner save setting screen 500.

Figure 6:
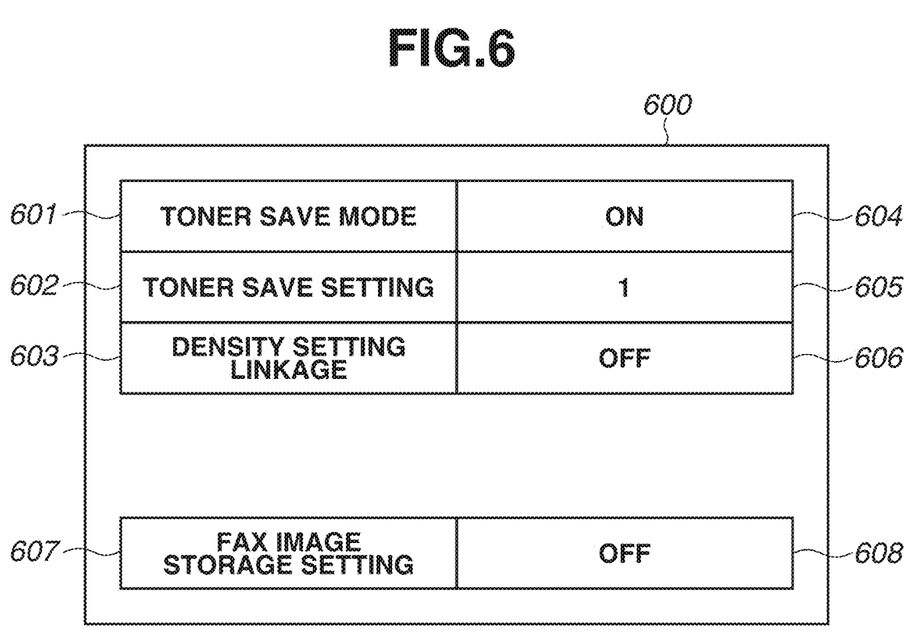
FIG. 6 is a diagram illustrating a mode setting data structure according to the first exemplary embodiment.

The CPU 201 stores a result of the determination in the DRAM 204 as user setting data 600 having a structure illustrated in FIG. 6. The user setting data 600 stored in the DRAM 204 is to be stored in the HDD 218 via the I/O control unit 214 before power OFF of the apparatus by the CPU 201, and is to be loaded from the HDD 218 into the DRAM 204 via the I/O control unit 214 at power ON.

If the CPU 201 does not detect that the user has pressed the user setting key 307 (NO in step S404), the processing proceeds to step S407. In step S407, the CPU 201 detects whether a copy icon 1201 displayed on the home screen 1200 has been pressed. If determining that the copy icon 1201 has been pressed (YES in step S407), the processing proceeds to step S408. In step S408, the CPU 201 causes the LCD panel 304 to display a copy screen 700 illustrated in FIG. 7.

Figure 7:
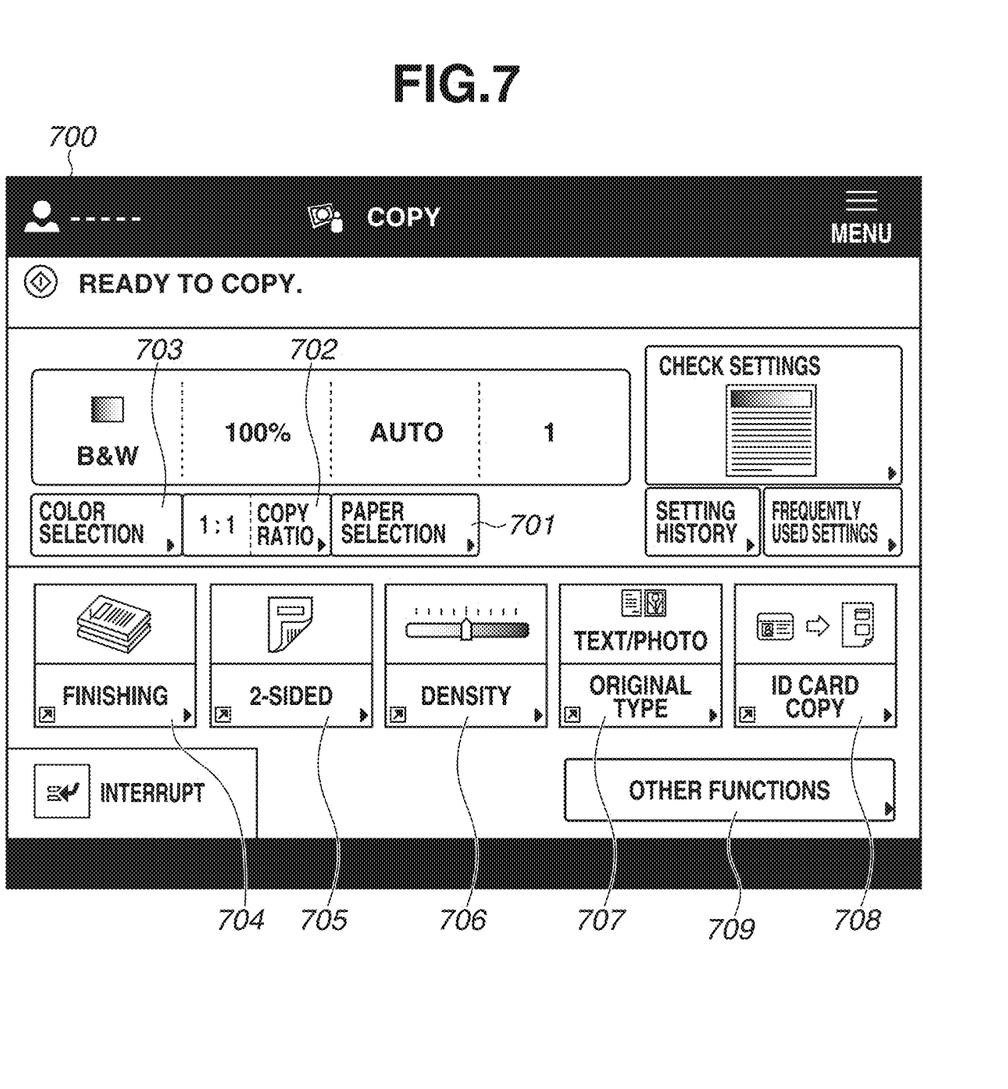
FIG. 7 is a diagram illustrating a copy function screen displayed on the operation unit according to the first exemplary embodiment.

The user can perform color selection 703 on the displayed copy screen 700. In addition, the user can select a copy ratio 702 for causing the graphic processor 203 to perform the scaling processing on the image data scanned by the scanner 209 and transferred by the CPU 210. Furthermore, the user can also press an item such as paper selection 701 for selecting either the cassette 131 or the cassette 132, 2-sided 705 for two-sided print setting, and density 706 for print density adjustment. In step S408, the CPU 201 detects settings desired by the user based on the coordinate data corresponding to the pressed item, and stores the detected settings in the DRAM 204 as copy settings 900 having a structure illustrated in FIG. 9.

In this state, in steps S409 and S410, the CPU 201 determines whether the user has pressed a start key 309 on the operation panel 300. If the user has pressed the start key 309 on the operation panel 300 (YES in step S410), the CPU 201 receives a key code of the start key 309 via the operation unit I/F 216 and the I/O control unit 214. Furthermore, the CPU 201 transmits an instruction to the CPU 210 via the I/O control unit 214, a serial communication controller 215, and the scanner I/F 208 as described above. In step S411, the CPU 210 causes the scanner 209 to scan the document 103 placed on the document tray 102.

Figure 9:
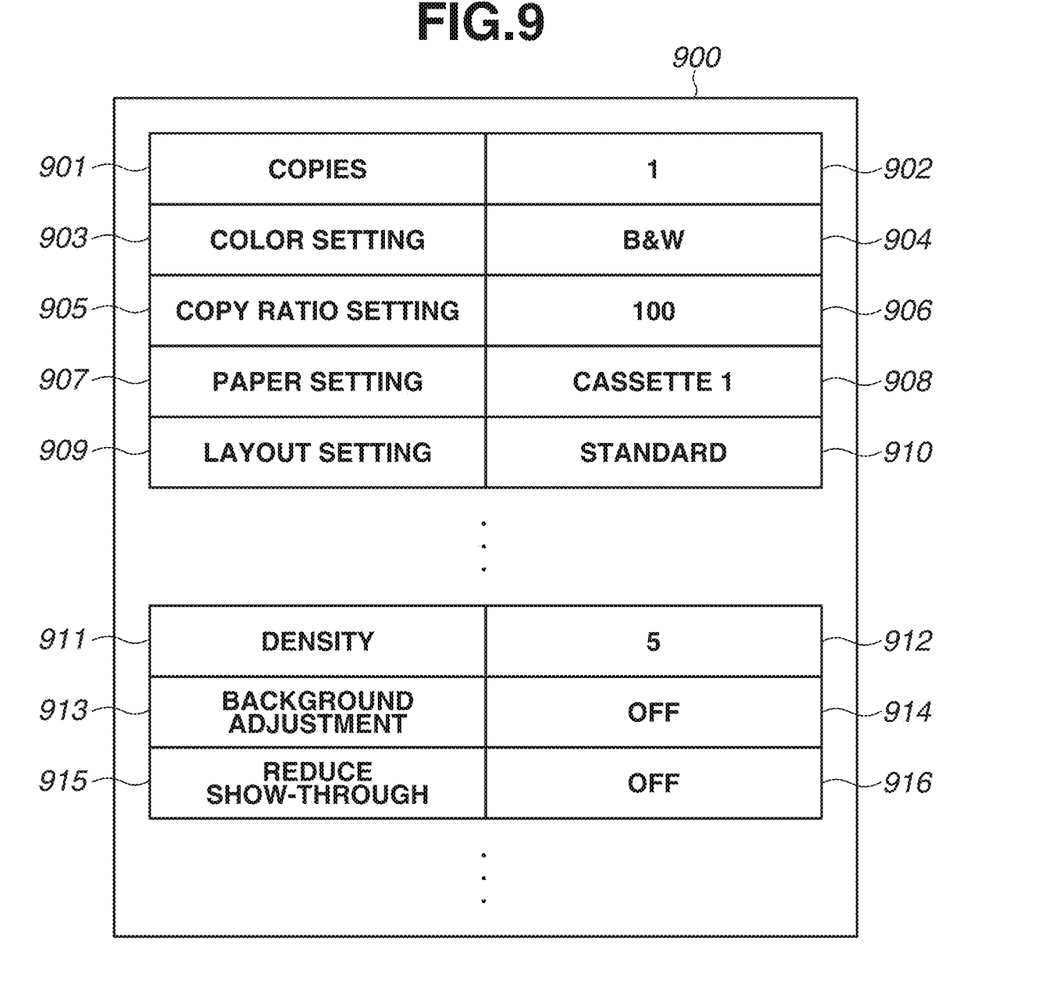
FIG. 9 is a diagram illustrating a copy function setting data structure according to the first exemplary embodiment.

The scanned image data is stored in the HDD 218 as described above. In step S412, processing is performed on the stored image data based on values in areas 902, 904, 906, 908, and 912 respectively corresponding to copies 901, color setting 903, copy ratio setting 905, paper setting 907, and density 911 in the copy settings 900 stored in the DRAM 204 in step S408. More specifically, the CPU 201 causes the graphic processor 203 to perform the scaling processing, density conversion processing, and the like.

In steps 413 and 414, the CPU 201 searches areas 604 and 605 that store values respectively corresponding to toner save mode 601 and toner save setting 602 in the user setting data 600. If the value in the area 604 is "ON", the CPU 201 transmits the value stored in the area 605 corresponding to the toner save setting 602, to a CPU 213 of the printer 212 via the I/O control unit 214 and the serial communication controller 215.

If the received value of the toner save setting 602 indicates that the toner save mode is ON (YES in step S414), the CPU 213 changes a direct mapping table based on the received value of the toner save setting 602 when YMCK data is to be input to the printer 212. Accordingly, the density for printing is changed. When K data is to be input to the printer 212, the CPU 213 changes a luminance-density conversion table. In this way, in step S415, the CPU 213 makes settings for reducing a toner consumption amount by reducing the density for printing the image data to be transmitted via the printer OF 211. The toner consumption amount indicates the amount of toner to be used.

In step S416, after the above-described settings are made on the CPU 213 of the printer 212, the CPU 201 transfers the image data processed by the graphic processor 203 to the printer 212 to perform print processing. The print processing is image formation on a sheet.

In step S417, the CPU 201 repeats the processing in S411 to S416 until being notified by the CPU 210 of the scanner 209 that the document 103 is no longer present on the document tray 102.

If the user does not operate any part of the operation panel 300 (NO in step S407), the CPU 201 neither receives code data nor coordinate data from the operation unit 217. In this case, in steps S418 and S419, the CPU 201 checks whether data is received from a network connected via the network I/F 205. If receiving data from the network (YES in step S419), the network I/F 205 stores the received data in the HDD 218 as describe above and notifies the CPU 201 of the reception.

In steps S420 and S421, when notified by the network I/F 205, the CPU 201 loads the data stored in the HDD 218 by the network I/F 205, into the DRAM 204 and determines the type of data based on a receiving device and the contents of the data stored in the DRAM 204.

If determining that the data received by the network I/F 205 is PDL data (YES in step S421), the processing proceeds to step S422. In step S422, the CPU 201 converts the PDL data in the DRAM 204 into image data based on the PDL function program loaded into the DRAM 204 as described above.

At this time, the CPU 201 searches the areas 604 and 605 that store the values respectively corresponding to the toner save mode 601 and the toner save setting 602 in the user setting data 600, similarly to the case of the copy function described above. In steps S423 and S424, the CPU 201 determines whether the value stored in the area 604 is "ON". If the value stored in the area 604 is "ON" (YES in step S424), the CPU 201 transmits the value stored in the area 605 corresponding to the toner save setting 602, to the CPU 213 of the printer 212 via the I/O control unit 214 and the serial communication controller 215. Accordingly, in step S425, the CPU 201 makes settings for reducing the toner consumption amount on the CPU 213 of the printer 212.

Then, in step S426, the CPU 201 transfers the image data, which has been converted from the PDL data and stored in the DRAM 204, to the printer 212 via the I/O control unit 214 and the printer I/F 211, so that the printer 212 performs printing. In step S427, the CPU 201 repeats the processing in steps S422 to S426 until the PDL data received by the network I/F 205 and stored in the HDD 218 is no longer present.

In steps S418 and S419, the CPU 201 checks whether data is received, also based on notification from the FAX unit 206. Upon receiving the notification from the FAX unit 206, the CPU 201 loads the data in the HDD 218 into the DRAM 204. The CPU 201 then determines the type of data based on the receiving device and the contents of the data stored in the DRAM 204. If determining that the received data is compressed image data received by the FAX unit 206, the CPU 201 performs the following processing: The CPU 201 causes the graphic processor 203 to perform the decompression processing and the scaling processing on the compressed image data stored in the DRAM 204, and transmits the processed data to the printer 212 via the I/O control unit 214 and the printer I/F 211. Then, in step S428, the printer 212 performs printing.

If the compressed image data received by the FAX unit 206 is printed, the CPU 201 does not refer to the value of the toner save mode 601 stored in the user setting data 600. Accordingly, the CPU 201 does not make settings for reducing the toner consumption amount on the CPU 213 of the printer 212. The words "reduce" and "save" used herein have the same meaning.

As described above, for image data (e.g., FAX data) that requires the user to ask the sender (another person) to transmit the image data again in a case where reducing the toner consumption amount results in illegible printing, the CPU 201 does not reduce the consumption amount, regardless of the value of the toner save mode 601.

Figure 10:
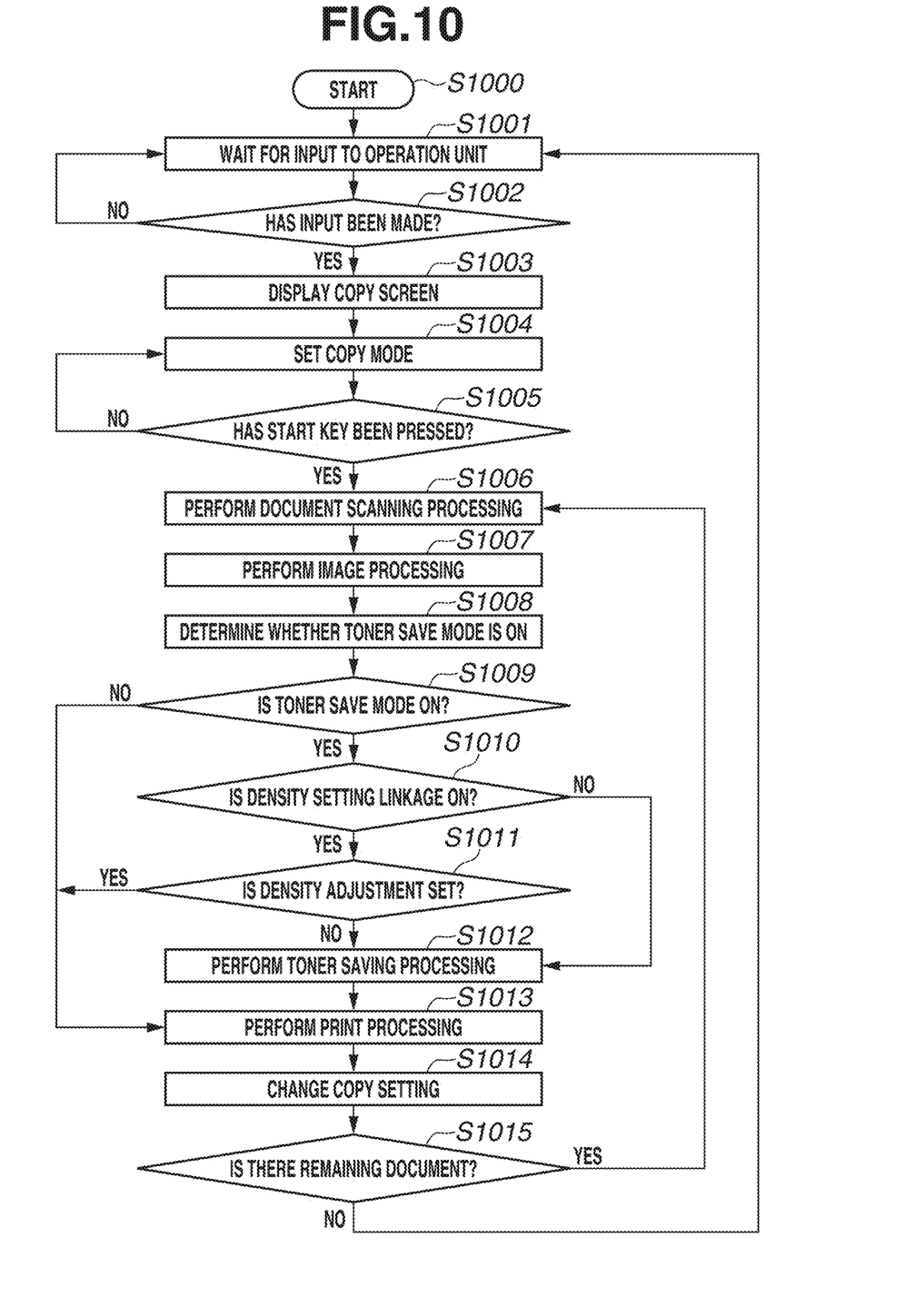
FIG. 10 is a control flowchart for density adjustment according to a second exemplary embodiment of the present disclosure.

Next, a second exemplary embodiment will be described with reference to a flowchart illustrated in FIG. 10.

When the users performs a series of operations started with the user setting key 307 as described above, the user selects ON 506 or OFF 507 of density setting linkage on the toner save setting screen 500 displayed by the CPU 201. Accordingly, the CPU 201 stores the setting made by the user in an area 606 corresponding to density setting linkage 603 in the user setting data 600 stored in the DRAM 204 via the above-described path.

Figure 8:
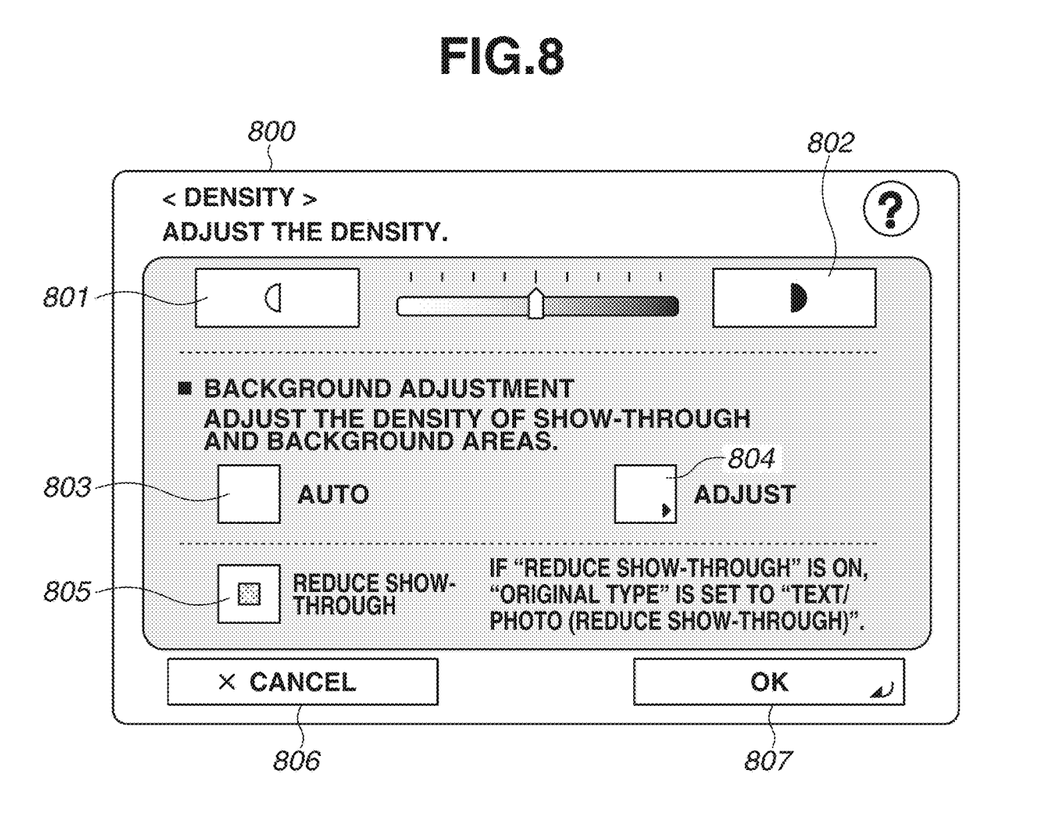
FIG. 8 is a diagram illustrating a density adjustment function screen displayed on the operation unit according to the first exemplary embodiment.

When the user presses the density 706 on the above-described copy screen 700, a density adjustment screen 800 illustrated in FIG. 8 is displayed. In step S1004, if an icon 801 is pressed on the density adjustment screen 800, the CPU 201 stores a numerical value lower than a numerical value indicating an initial density in the area 912 corresponding to the density 911 in the copy settings 900 in the DRAM 204. If an icon 802 is pressed, the CPU 201 stores a numerical value higher than the numerical value indicating the initial density in the area 912.

In step S1005, the CPU 201 determines whether the user has pressed the start key 309 on the operation panel 300. If the user has pressed the start key 309 on the operation panel 300 (YES in step S1005), the processing proceeds to step S1006. In step S1006 and S1007, when notified of code data of the start key 309, the CPU 201 performs document scanning processing and image processing, respectively, as described above. In step S1008, the CPU 201 performs toner save determination processing as described above.

In step S1009, the CPU 201 determines whether the toner save mode 601 in the user setting data 600 is ON. If the toner save mode 601 is ON (YES in step S1009), the processing proceeds to step S1010. In step S1010, the CPU 201 determines, based on the value in the area 606, whether the density setting linkage 603 is ON. If determining that the density setting linkage 603 is ON (YES in step S1010), the processing proceeds to step S1011. In step S1011, the CPU 201 determines, based on the value in the area 912 corresponding to the density 911 in the copy settings 900, whether the density has been adjusted on the density adjustment screen 800.

If the CPU 201 determines based on the value in the area 912 that the density has been adjusted by the user (YES in step S1011), the processing proceeds to step S1013. In step S1013, the CPU 201 performs print processing without performing the toner save processing in step S1012.

In step S1014, after performing the print processing in step S1013, the CPU 201 stores, if the user changes the density again on the density adjustment screen 800, the changed density in the area 912 corresponding to the density 911 in the copy settings 900. Subsequently, in step S1015, the CPU 201 repeats the processing from the document scanning processing in step S1006 to the print processing in step S1013 until the document 103 is no longer present on the document tray 102.

Figure 11:
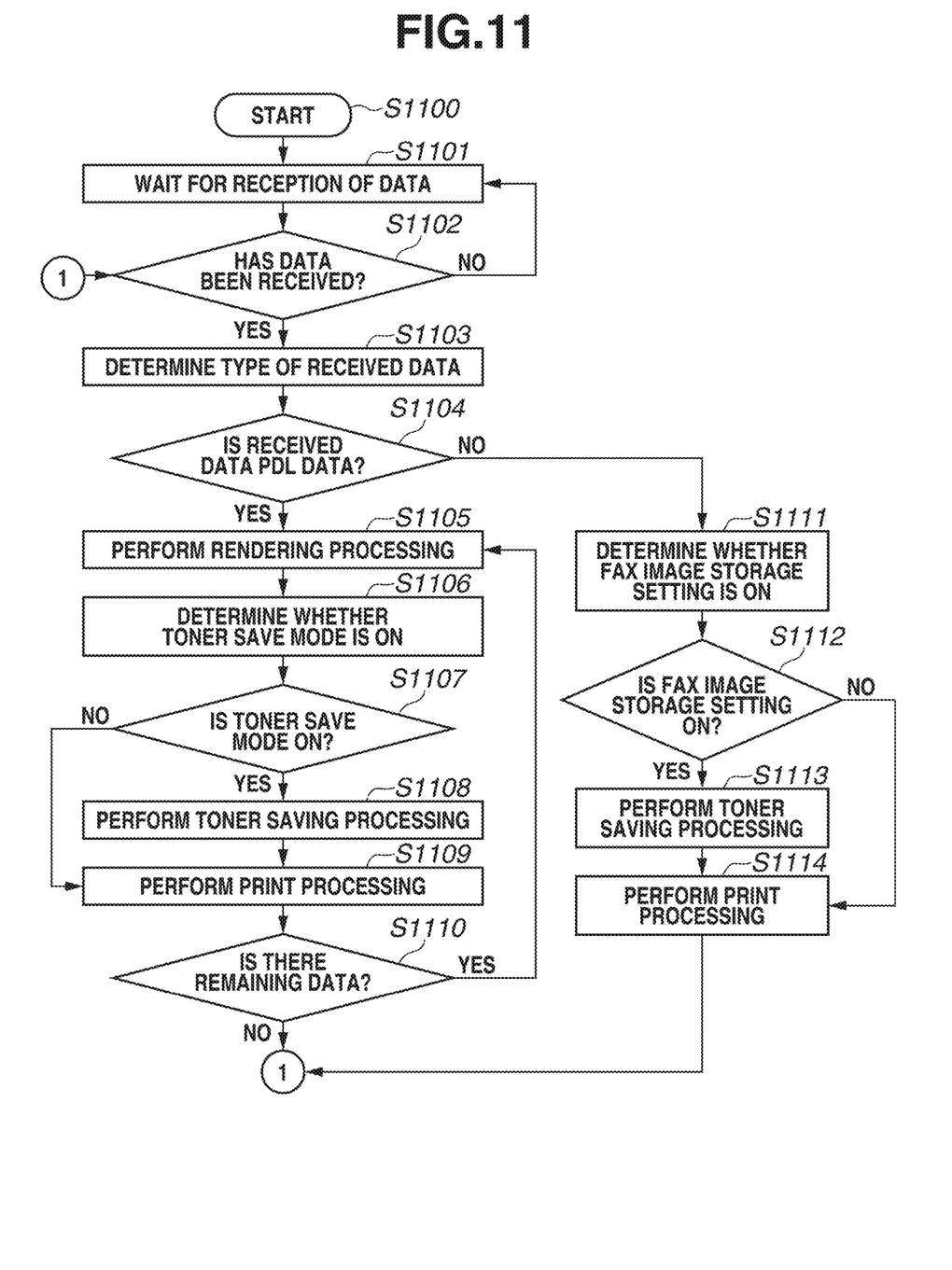
FIG. 11 is a control flowchart for facsimile (FAX) reception setting according to a third exemplary embodiment of the present disclosure.

A third exemplary embodiment will be described with reference to a flowchart illustrated in FIG. 11.

The user selects, on the screen displayed by the press of the user setting key 307, whether the compressed image data to be stored in the HDD 218 by the FAX unit 206 is to be stored or deleted after printing. The selection is then stored in an area 608 corresponding to a FAX image storage setting 607 in the user setting data 600. Storing the image data after printing means storing the image data in a reusable manner so that the image data can be printed again after printing.

In this state, in steps S1101 and S1102, the CPU 201 receives data as described above. In step S1104, the CPU 201 determines the type of data to be stored in the HDD 218. If determining that the data on the DRAM 204 is compressed image data received from the FAX unit 206 (NO in step S1104), the CPU 201 refers to the FAX image storage setting 607 described above.

In step S1112, the CPU 201 determines whether the FAX image storage setting 607 is ON. If the CPU 201 determines that the FAX image storage setting 607 is OFF (NO in step S1112), the processing proceeds to step S1114. In step S1114, the CPU 201 causes the CPU 213 of the printer 212 to perform printing without performing the above-described toner save processing in step S1113.

The exemplary embodiments of the present disclosure can be implemented by processing in which a program for implementing one or more functions according to the above-described exemplary embodiments is supplied to a system or an apparatus via a network or a storage medium, and one or more processors in a computer of the system or the apparatus read and execute the program. Furthermore, the exemplary embodiments of the present disclosure can also be implemented by a circuit (e.g., application-specific integrated circuit (ASIC)) for implementing one or more functions according to the exemplary embodiments.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-014213, filed Jan. 30, 2020, which is hereby incorporated by reference herein in its entirety.

What is claimed is:

1. An image forming apparatus to reduce a consumable material to be used for printing image data having a density, the image forming apparatus comprising:
   a scanner configured to scan a document to obtain image data representing the scanned document;
   a receiver configured to receive faxed image data that is different from the image data obtained by the scanner; and
   one or more controllers including one or more processors and one or more memories to perform operations including:
   in a case where target image data is the obtained image data from the scanner and the reduction of the consumable material is set, the one or more controllers perform control to reduce the usage of the consumable material by reducing the density of the obtained image data, and
   in a case where the target image data is the faxed image data from the receiver, the one or more controllers perform control not to reduce the density of the received faxed image data, even though the reduction of the consumable material is set, such that the usage of the consumable material is not reduced in performing print processing on the faxed image data.

2. The image forming apparatus according to claim 1, wherein the receiver includes a network interface connected to a network and a fax machine connected to a public telephone line,
   wherein, in a case where the target image data is image data received by the network interface via the network, the one or more controllers perform control to reduce the density of the image data received by the network interface, and
   wherein, in a case where the target image data is image data received by the fax machine via the public telephone line, the one or more controllers perform control not to reduce the density of the image data received by the fax machine.

3. The image forming apparatus according to claim 1, wherein the operations further include:
   printing, via a printer, the obtained image data subjected to the reduction of the density, and
   printing, via the printer, the received faxed image data not subjected to the reduction of the density.

4. The image forming apparatus according to claim 3, wherein the printer is configured to put the consumable material on a sheet for printing image data.

5. The image forming apparatus according to claim 1, wherein the operations further include setting, based on reception of the faxed image data, whether the faxed image data is automatically printed or stored without being automatically printed until an instruction by a user to print the faxed image data is received,
   wherein, in a case where the faxed image data is set to be automatically printed and the reduction of the consumable material is set, the one or more controllers perform control not to reduce the density of the received faxed image data such that the usage of the consumable material is not reduced, and
   wherein, in a case where the faxed image data is set to be stored without being automatically printed until the instruction by the user to print the faxed image data is received and the reduction of the consumable material is set, the one or more controllers perform control to reduce the density of the received faxed image data to reduce the usage of the consumable material.

6. A method for an image forming apparatus to reduce a consumable material to be used for printing image data having a density, the method comprising:
   scanning, via scanner, a document to obtain image data representing the scanned document;
   receiving, via a receiver, faxed image data that is different from the image data obtained by the scanner; and
   performing control,
   wherein, in a case where target image data is the obtained image data from the scanner and the reduction of the consumable material is set, performing control includes performing control to reduce the usage of the consumable material by reducing the density of the obtained image data, and
   wherein, in a case where the target image data is the faxed image data from the receiver, performing control includes performing control not to reduce the density of the received faxed image data, even though the reduction of the consumable material is set, a such that the usage of the consumable material is not reduced in performing print processing on the faxed image data.

7. The method according to claim 6,
   wherein the receiver includes a network interface connected to a network and a fax machine connected to a public telephone line,
   wherein, in a case where the target image data is image data received by the network interface via the network, performing control includes performing control to reduce the density of the image data received by the network interface, and
   wherein, in a case where the target image data is image data received by the fax machine via the public telephone line, performing control includes performing control not to reduce the density of the image data received by the fax machine.

8. The method according to claim 6, further comprising:
   printing, via a printer, the obtained image data subjected to the reduction of the density; and
   printing, via the printer, the received faxed image data not subjected to the reduction of the density.

9. The method according to claim 8, wherein printing includes putting the consumable material on a sheet via the printer for printing image data.

10. The method according to claim 6, further comprising setting, based on reception of the faxed image data, whether the faxed image data is automatically printed or stored without being automatically printed until an instruction by a user to print the faxed image data is received,
    wherein, in a case where the faxed image data is set to be automatically printed and the reduction of the consumable material is set, performing control includes performing control not to reduce the density of the received faxed image data such that the usage of the consumable material is not reduced, and
    wherein, in a case where the faxed image data is set to be stored without being automatically printed until the instruction by the user to print the faxed image data is received and the reduction of the consumable material is set, performing control includes performing control to reduce the density of the received faxed image data to reduce the usage of the consumable material.

11. A non-transitory computer-readable storage medium storing a program to cause a computer to perform a method for an image forming apparatus to reduce a consumable material to be used for printing image data having a density, the method comprising:

scanning, via scanner, a document to obtain image data representing the scanned document;

receiving, via a receiver, faxed image data that is different from the image data obtained by the scanner; and performing control, wherein, in a case where target image data is the obtained image data from the scanner and the reduction of the consumable material is set, performing control includes performing control to reduce the usage of the consumable material by reducing the density of the obtained image data, and wherein, in a case where the target image data is the faxed image data from the receiver, performing control includes performing control not to reduce the density of the received faxed image data, even though the reduction of the consumable material is set, such that the usage of the consumable material is not reduced in performing print processing on the faxed image data.

12. The non-transitory computer-readable storage medium according to claim 11, wherein the receiver includes a network interface connected to a network and a fax machine connected to a public telephone line, wherein, in a case where the target image data is image data received by the network interface via the network, performing control includes performing control to reduce the density of the image data received by the network interface, and wherein, in a case where the target image data is image data received by the fax machine via the public telephone line, performing control includes performing control not to reduce the density of the image data received by the fax machine.

13. The non-transitory computer-readable storage medium according to claim 11, the method further comprising:

printing, via a printer, the obtained image data subjected to the reduction of the density; and printing, via the printer, the received faxed image data not subjected to the reduction of the density.

14. The non-transitory computer-readable storage medium according to claim 13, wherein printing includes putting the consumable material on a sheet via the printer for printing image data.

15. The non-transitory computer-readable storage medium according to claim 11, the method further comprising setting, based on reception of the faxed image data, whether the faxed image data is automatically printed or stored without being automatically printed until an instruction by a user to print the faxed image data is received, wherein, in a case where the faxed image data is set to be automatically printed and the reduction of the consumable material is set, performing control includes performing control not to reduce the density of the received faxed image data such that the usage of the consumable material is not reduced, and wherein, in a case where the faxed image data is set to be stored without being automatically printed until the instruction by the user to print the faxed image data is received and the reduction of the consumable material is set, performing control includes performing control to reduce the density of the received faxed image data to reduce the usage of the consumable material.

16. An image forming apparatus to reduce a consumable material to be used for printing image data having a density, the image forming apparatus comprising:

a scanner configured to scan a document to obtain image data representing the scanned document;

a receiver configured to receive image data; and one or more controllers including one or more processors and one or more memories to perform operations including:

in a case where the image data received is page description language (PDL) image data and the reduction of the consumable material is set, the one or more controllers perform control to reduce the usage of the consumable material by reducing the density of the received PDL image data, and in a case where the image data received is compressed image data, the one or more controllers perform control not to reduce the density of the received faxed image data, even though the reduction of the consumable material is set, such that the usage of the consumable material is not reduced in performing print processing on the received compressed image data.

* * * * *